(12) United States Patent
Goltz

(10) Patent No.: US 7,251,911 B2
(45) Date of Patent: Aug. 7, 2007

(54) LEG SUPPORT APPARATUS FOR TREES AND BUSHES

(76) Inventor: Robert A. Goltz, P.O. Box 1931, Williamsville, NY (US) 14231

( * ) Notice: Subject to any disclaimer, the term of this patent is extended or adjusted under 35 U.S.C. 154(b) by 0 days.

(21) Appl. No.: 11/437,485

(22) Filed: May 19, 2006

(65) Prior Publication Data

US 2006/0207169 A1 Sep. 21, 2006

Related U.S. Application Data

(62) Division of application No. 10/851,836, filed on May 21, 2004.

(60) Provisional application No. 60/472,927, filed on May 23, 2003.

(51) Int. Cl.
*A01G 9/12* (2006.01)
(52) U.S. Cl. ............................................. 47/43
(58) Field of Classification Search ................ 47/43
See application file for complete search history.

(56) References Cited

U.S. PATENT DOCUMENTS

| 197,857 | A | 12/1877 | Jameson |
|---|---|---|---|
| D22,653 | S | 8/1893 | McGill |
| D35,265 | S | 11/1901 | McIntyre |
| 748,440 | A | 12/1903 | Underwood |
| 1,021,650 | A | 3/1912 | Worthington |
| 2,352,320 | A | 6/1944 | Leo |
| 2,513,461 | A | 7/1950 | Duncan, Jr. |
| 3,262,665 | A | 7/1966 | Black |
| 3,273,841 | A | 9/1966 | Cota |
| 3,315,411 | A | 4/1967 | Fitzgerald |
| 4,179,847 | A | 12/1979 | Osterwalder |
| 5,050,339 | A | 9/1991 | Howell |
| D342,651 | S | 12/1993 | Manos |
| D363,015 | S | 10/1995 | Campbell et al. |
| D372,406 | S | 8/1996 | Scarvaglione |
| D377,299 | S | 1/1997 | McGill |
| 5,953,858 | A | 9/1999 | Loosen |
| 6,021,601 | A | 2/2000 | Weathers |
| 6,095,935 | A | 8/2000 | Gooselaw et al. |
| D437,750 | S | 2/2001 | Kinn |
| 2005/0217170 | A1 | 10/2005 | Reeves |

FOREIGN PATENT DOCUMENTS

JP 06181642 A * 7/1994 .................... 47/42

* cited by examiner

*Primary Examiner*—Francis T. Palo
(74) *Attorney, Agent, or Firm*—Hodgson Russ LLP

(57) ABSTRACT

A leg support apparatus comprising a leg comprising a first support and a second support. The leg comprising a pivot end and a spike end. A base comprising a lug side, a ground contact side, and a surrounding wall connecting between the lug side and ground contact side, with lugs extending from the lug side. A pin used for pivotally connecting the lugs to the pivot end of the leg. A spike extending from the spike end of the leg. The spike used for engaging a wire basket surrounding the root ball of a plant or used for engaging the lip of a container holding a plant, so that the plant is supported by the leg support apparatus and ground and does not tip over. A leg support apparatus comprising a body comprising a rocker bottom base from which extends a leg, and wherein a spike extends from the spike end of the leg, and the spike is used for engaging a wire basket surrounding a root ball and preventing the plant from tipping over.

14 Claims, 11 Drawing Sheets

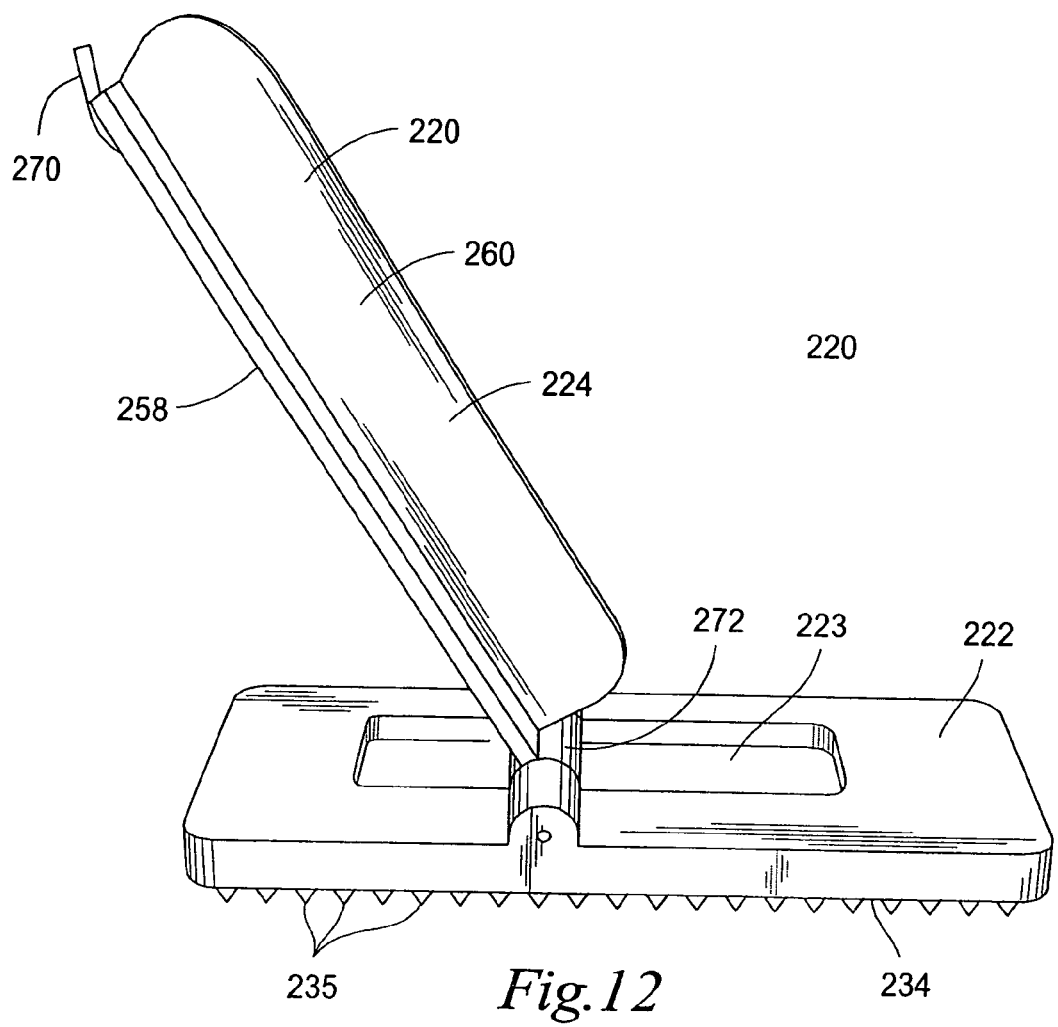
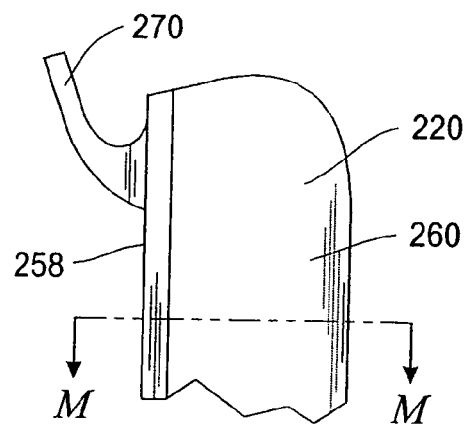
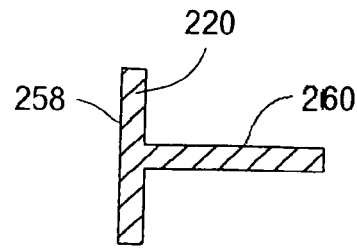
Fig.12
Fig.12A
Fig.12B

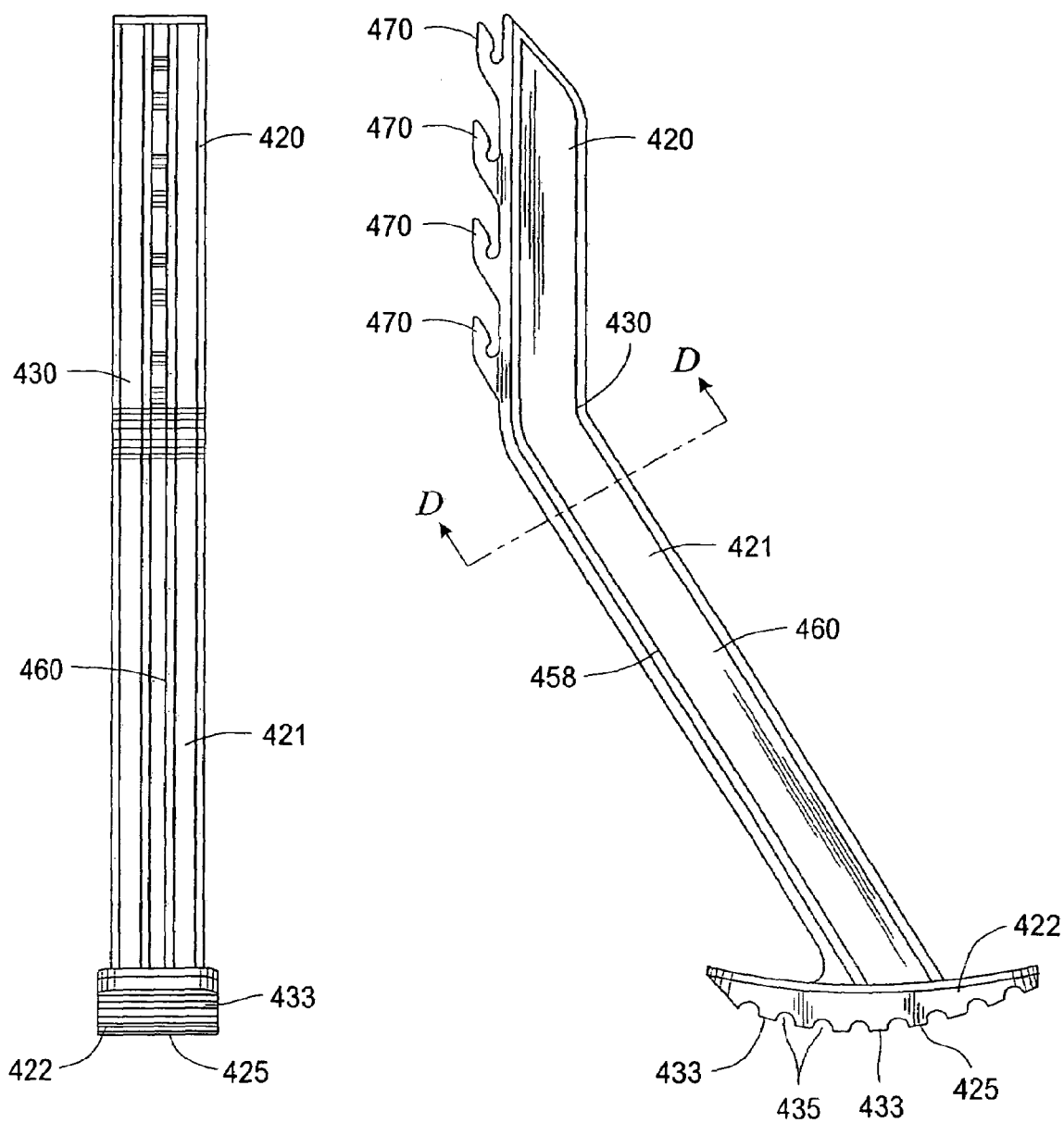

LEG SUPPORT APPARATUS FOR TREES AND BUSHES

CROSS-REFERENCE TO RELATED APPLICATIONS

This application is a divisional of U.S. application Ser. No. 10/851,836 filed May 21, 2004 to Goltz and entitled Leg Support Apparatus For Unplanted Trees and Bushes, which claims the benefit of U.S. Provisional patent Application No. 60/472,927 filed on May 23, 2003, to Goltz and entitled Leg Support Apparatus For Unplanted Trees and Bushes.

BACKGROUND

In the horticulture industry, trees, bushes, and large plants are delivered from the growers to sales lots. The sales lots may be wholesalers or retailers. A problem exists in the manner by which tree, bushes, and plants are handled in the sales lots. Take for example the root ball of a typical tree, which may be two or more feet in diameter. The root ball is typically wrapped in burlap, and a wire basket surrounds the burlap. The tree has a tendency flip over because it is top heavy and because of the round shape of the root ball. The tree is thus damaged when it tips over and impacts the ground.

To solve the problems associated with trees tipping over, the nursery industry uses cinder blocks. The cinder blocks can weigh between twenty and thirty pounds and are manually positioned around the root ball. The cinder blocks are used for supporting the root ball such that the tree or bush is forced to stand upright.

However, there are numerous problems associated with the use of cinder blocks. First, the nursery must maintain a good supply of heavy blocks in stock. This occupies precious space and creates a hazard when new plants and bushes arrive, because the cinder blocks are constantly in the way. Additionally, heavy equipment is needed to move large quantities of the blocks. Cinder blocks are relatively brittle and have a tendency to break when dropped. As a result, a nursery can use thousands of cinder blocks in a typical planting season. Then there are the significant problems associated with manually handling the blocks. Workers can and do strain their backs, cut their hands on the blocks, and drop blocks on their feet.

To make matter worse, even with the use of cinder blocks, the top heavy trees can still topple over. For example, if a wind comes up the tree, will fall over since it cannot withstand the wind load. The result is damaged trees and large inventory losses.

It is further noted that sometimes the tree/plant arrives in a cylindrical/truncated cone shaped container or pot. Even when the plant/tree is in a container or pot, it still has a tendency to tip over because it is top heavy. Thus, the use of containers or pots does not solve the problem of plants tipping over.

Thus, there is a need for a better apparatus and methodology of supporting unplanted trees, bushes, and plants. It would be desirable if the apparatus was light weight, easy to make and use, and inexpensive. It would also be desirable if the device was compact and durable so that it can be reused.

SUMMARY

The present leg support apparatus solves the problems associated with the use of cinderblocks. In a first embodiment, the leg support apparatus comprises a leg having a first support and a second support. The second support is perpendicular to the first support. Thus, the leg has a generally T-shaped cross section. The leg comprises a pivot end defining a pivot pin hole and a spike end from which a spike extends. A spike extends from the spike end of the legs, and the spike is used for engaging the wire basket that surrounds a root ball or is used for engaging the rim of plant container.

A base is provided having a lug side, a cleat or ground contact side, and a surrounding wall connecting between the lug side and ground contact side is provided. Lugs extend from the lug side and the lugs define lug holes. A pivot pin is provided. The pivot pin is received in the lug holes and the pivot pin hole in the leg and is used for pivotally connecting the lugs to the leg. A hinged connection is thus formed between the base and the leg.

The base further comprises a leg recess defined in the lug side of the base and between the lugs. The leg recess is used for allowing the leg to be pivoted relative to the base. The base also defines an opening that is used for receiving a ground stake therethrough. This allows the base to be staked to the ground if necessary with a ground stake.

The spike end of the leg comprises a bend and a bent portion. The bent portion has a contact surface and the spike extends from the contact surface. In one embodiment, the contact surface may be at about a sixty degree angle to the first support.

The leg support apparatus can comprise plastics, epoxies, metals, metal alloys, wood, and combinations thereof.

The leg support apparatus is made by providing a leg comprising a first support and a second support such that the second support is perpendicular to the first support. The leg is provided with a pivot end and a spike end. A base is provided having a lug side, a ground contact side, and a surrounding wall connecting between the lug side and ground contact side. Lugs are formed on the lug side of the base. A pin is provided and used for pivotally connecting the lugs to the leg. A spike extends from the spike end of the leg.

In a second embodiment the leg support apparatus has a leg having a recess which receives a connecting stake. A planting stake connects to the connecting stake a guy rope is used to tie the tree to the planting stake. The tree can be both anchored and staked.

In a third embodiment, there is a hinged connection between the base and leg and the spike extends directly out of the spike end of the leg.

In a fourth embodiment, a leg support apparatus comprises a body having a leg and a rocker bottom base. The leg extends from the rocker bottom base. The rocker bottom base has a ground contact side that has a curved shape or rocker shape. Grips are formed in the ground contacting side and used for allowing the leg support apparatus to grip the ground. A spike extends from the spike end of the leg and the spike is formed integral with the spike end. The spike used for used for engaging the wire basket surrounding a root ball or lip of a container.

In a fifth embodiment, the leg support apparatus comprises a body having rocker bottom base and a leg. The leg has a bend in it and a plurality of spikes extending from the leg.

In a sixth embodiment the leg support apparatus comprises a body having a leg that extends from a rocker bottom base. The rocker bottom base is formed such that it has cleats.

BRIEF DESCRIPTION OF THE DRAWINGS

At the outset it is noted that common reference numbers used throughout the drawings refer to common parts or features.

FIG. 12 shows a perspective view of a third embodiment of the leg support apparatus.

FIG. 12A shows a front elevational view, partly in section, of the second third of the leg support apparatus.

FIG. 12B shows a sectional view of third embodiment of the leg support apparatus taken along cut line M-M.

FIG. 14 shows a front elevational view of a fifth embodiment of the leg support apparatus.

FIG. 15 shows a right side elevational view of the fifth embodiment of the leg support apparatus.

DETAILED DESCRIPTION

Figure 1:
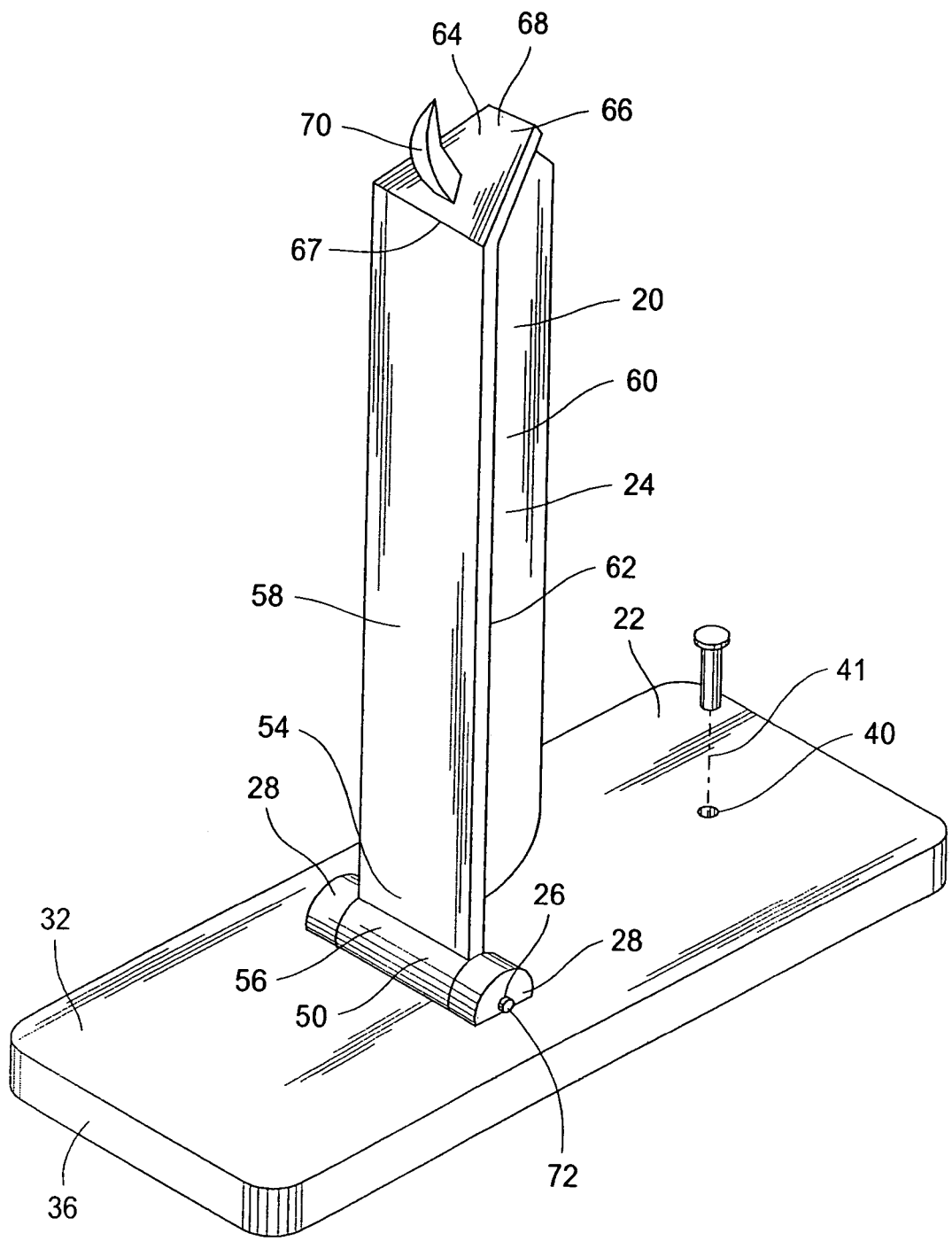
FIG. 1 is a perspective view of the leg support apparatus.

The leg support apparatus 20 is shown in FIGS. 1-11A. The leg support apparatus 20 comprises a base 22 and a leg 24. A pivot pin is provided and used for pivotally connecting the base 22 and leg 24 together. The leg 24 can be pivoted back and forth relative to the base 22 in the direction indicated by the arrows designated P-P in FIG. 1.

FIGS. 2-6 show the base 22. The base 22 has a lug side 32, a ground contacting side 34, and a surrounding side wall 36 that connects between the ground contacting side 34 and lug side 32. The base 22 has lugs 28 that extend from the lug side 32. The lugs 28 define lug holes or lug openings 30. In the lug side 32 of the base 22 and between the lugs 28, a leg recess 38 is defined. The leg recess 38 provides clearance so that the leg 24 can be pivoted back and forth in a manner to be described presently. The base 22 also defines a hole or opening 40. The opening 40 is used for allowing a ground stake 41 (FIG. 1) to be received and moved therethrough. This allows the leg support apparatus 20 to be staked or secured to the ground if necessary.

Figure 2:
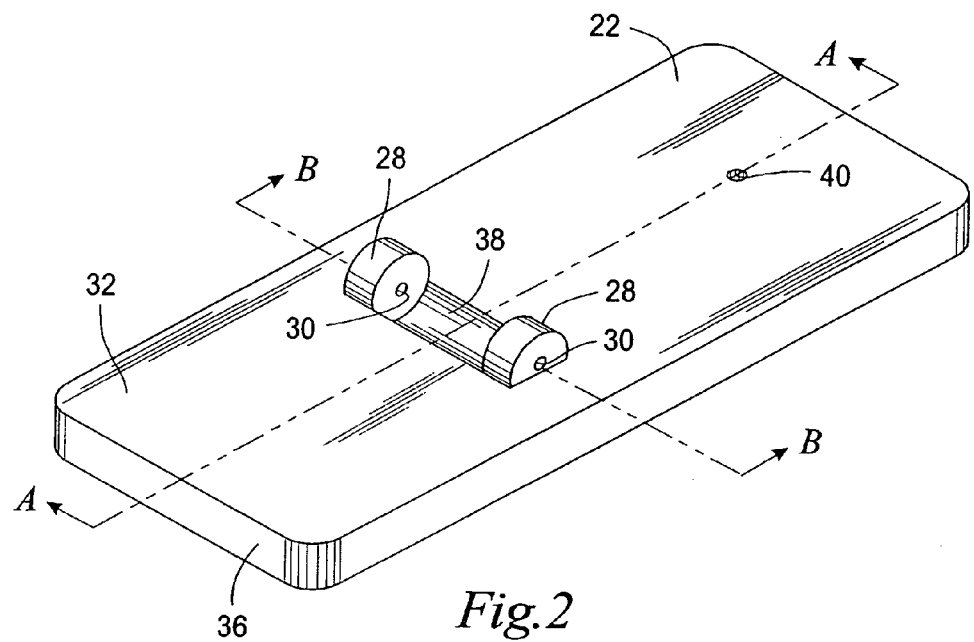
FIG. 2 is a perspective view of the base of the leg support apparatus.
Figure 3:
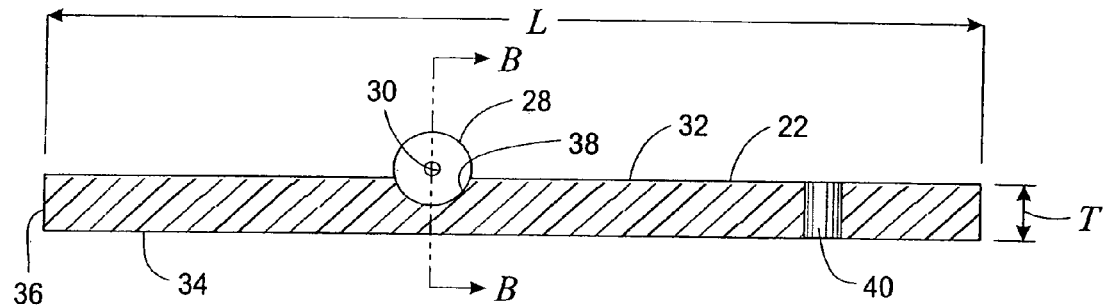
FIG. 3 is a sectional view of the base of the leg support apparatus taken along cut line A-A.
Figure 4:
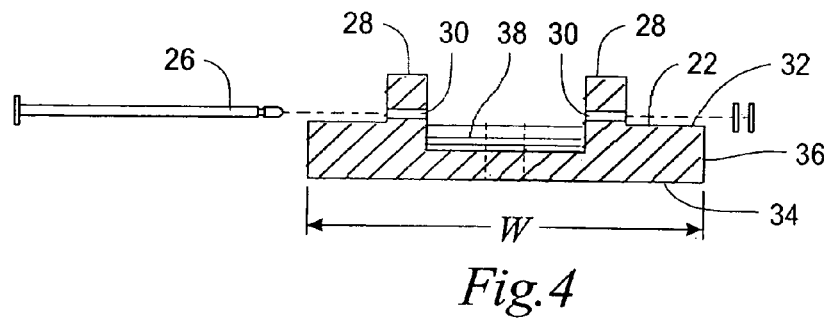
FIG. 4 is a sectional view of the base of the leg support apparatus taken along cut line B-B.
Figure 5:
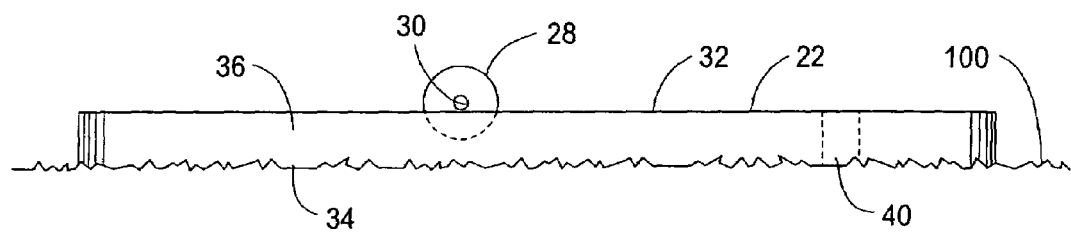
FIG. 5 is a front elevational view of the base of the leg support apparatus.
Figure 6:
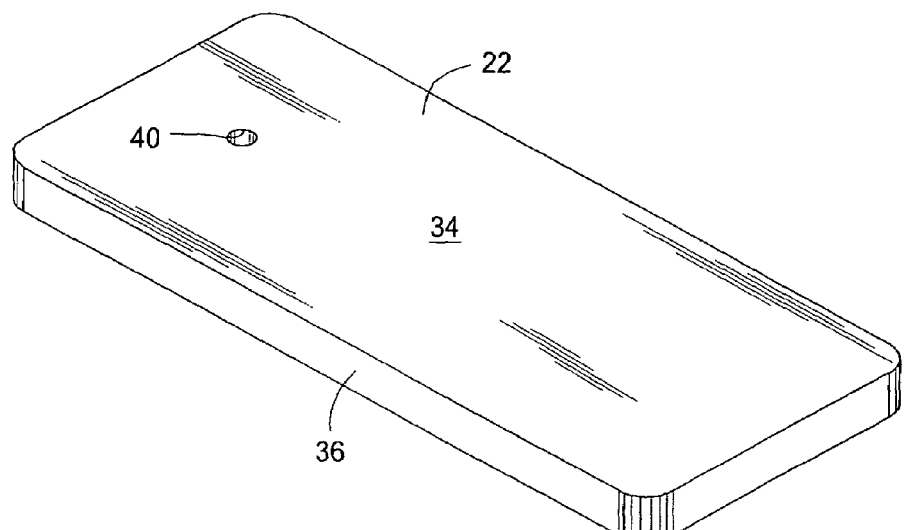
FIG. 6 is perspective view of the ground contact side of the base of the leg support apparatus.

FIG. 3 is a sectional view of the base 22 taken along cut line A-A of FIG. 2. FIG. 4 is a sectional view of the base 22 taken along cut line B-B of FIG. 3.

The base 22 is generally rectangular-shaped, and has a length designate L in FIG. 3 and a width designated W in FIG. 4. For example, the width W can be about four inches and the length L can be about eight inches. The thickness, designated T in FIG. 3, can be about one inch. In other embodiments the base 22 could have other shapes and could be otherwise dimensioned. Also, the ground contacting side 34 can be textured so as to increase friction between the base 22 and the ground 100. The ground 100 (FIG. 5) can be earth, nursery grounds, concrete, asphalt, or any surface with which the ground contact side 34 of the base 22 makes contact.

Figure 8:
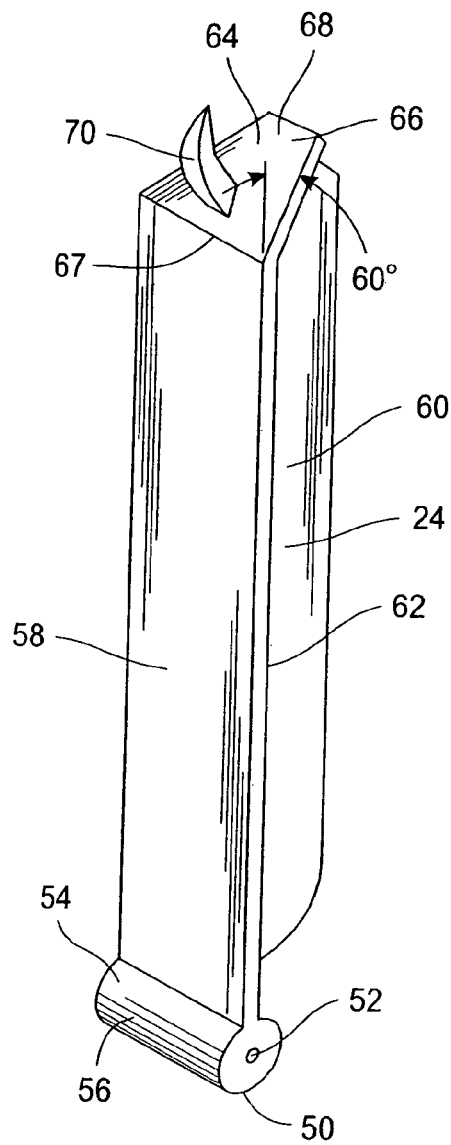
FIG. 8 is a perspective view of the leg of the leg support apparatus.
Figure 9:
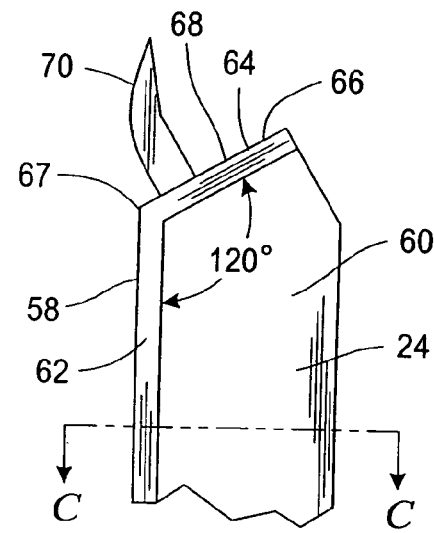
FIG. 9 is a front elevation view, partly in section, of the hook end of the leg.
Figure 10:
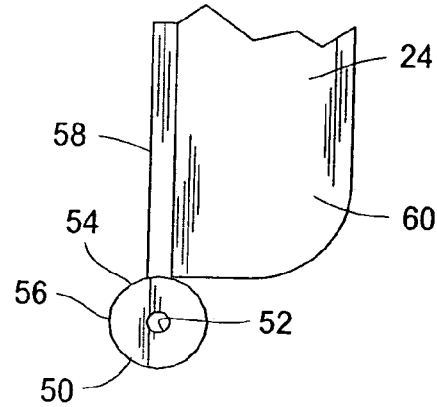
FIG. 10 is a front elevational view, partly in section, of the pivot end of the leg.
Figure 11:
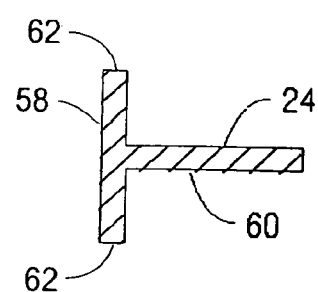
FIG. 11 is a sectional view of the leg taken along cut line C-C.

The leg 24 is shown in FIGS. 1, 8-11A. The leg 24 has a pivot portion 54 at its pivot end 50. The pivot portion 54 defines a pivot pin hole or opening 52 sized to receive the pivot pin 60 therein. The leg 24 has a cylindrical shaped pivot portion 54 having a cylindrical surface 56 at its pivot end 60. The leg 24 has a first support 58 that extends from the pivot portion 54, as shown in FIG. 8 and 10. The leg 24 also has a second support 60 which is connected to the first support 58, as shown in FIGS. 1, 8-11. The first support and second support 58, 60, respectively, are perpendicular to one another as shown in FIG. 11, which is a view of the leg 24 taken along cut line C-C of FIG. 9. The leg 24 thus has a T-shaped cross section. It is noted that the first and second supports, 58, 60, respectively can be formed as a body. Also, the first support 58 has side edges 62 (FIG. 11), and the second support 60 meets with the first support 58 at about midway between the side edges 62. This arrangement of the first and second support, 58, 60, respectively, provides the leg 24 with structural strength that resists twisting and bending.

The leg 24 further comprises a spike end 64. At the spike end 64, the first support 58 connects with a bent portion 66 at a bend 67, as shown in FIGS. 1, 8-9. At the bend 67, the bent portion 66 is at about a 60° angle (sixty degree angle) with the first support 58, as shown in FIGS. 8 and 9. The bent portion 66 has a contact surface 68 from which extends a spike 70. The spike 70 can be formed as part of the leg 24, for example if the leg 24 comprises plastic, epoxy, and other similar materials known to those having ordinary skill in the art. The utility of the spike 70 to be described presently. The leg 24 can be about six inches long or about twelve inches long, but can have other lengths depending on the requirements of the nursery or requirements of a particular application.

Figure 7:
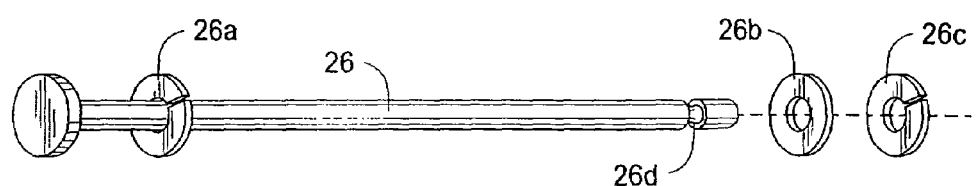
FIG. 7 shows an exploded view of the pin and washers.

The pivot end 50 of the leg 24 is pivotally connected to the base 22 by the pivot pin 26. The pivot pin 26 is shown in FIGS. 4 and 7. The pivot pin 26 includes a lock washer 26a, a flat washer 26b, and a high strength clip 26c. The pivot pin 26 defines a notch 26d. In particular, to install the pivot pin 26 the pivot end 50 of the leg 26 is moved between the lugs 28 the lug openings 30 and aligned with the pivot pin hole 52. The pivot pin 26 is inserted therein and the clip 26c is fitted into the notch 26d, thus securing the pivot pin 26 in place. The leg 24 is thus secured to the base 22 at a hinged connection 72 as shown in FIG. 1. Thus, the leg 24 can pivot back and forth with respect to the base 22. It is noted that the leg recess 38 provides clearance for the cylindrical surface 56 of the pivot end 50 of the leg 24, so that there is no undesirable interference between the leg 24 and the base 22 as pivoting occurs.

Additionally, the hinged connection 72 permits the leg support apparatus 20 to be self leveling when placed on the ground. The hinged connection 72 further allows the leg support apparatus 20 to be folded when not in use. This allows for compact storage of a plurality of leg support apparatuses 20 in a small area.

When trees, bushes, plants, and so forth arrive at the nursery after having been shipped from various growers, their balls are typically in burlap sacks or wrapped in burlap. The burlap is usually encased in wire basket. The trees, bushes, and plants can also arrive in containers having lips surrounding their openings.

Figure 11A:
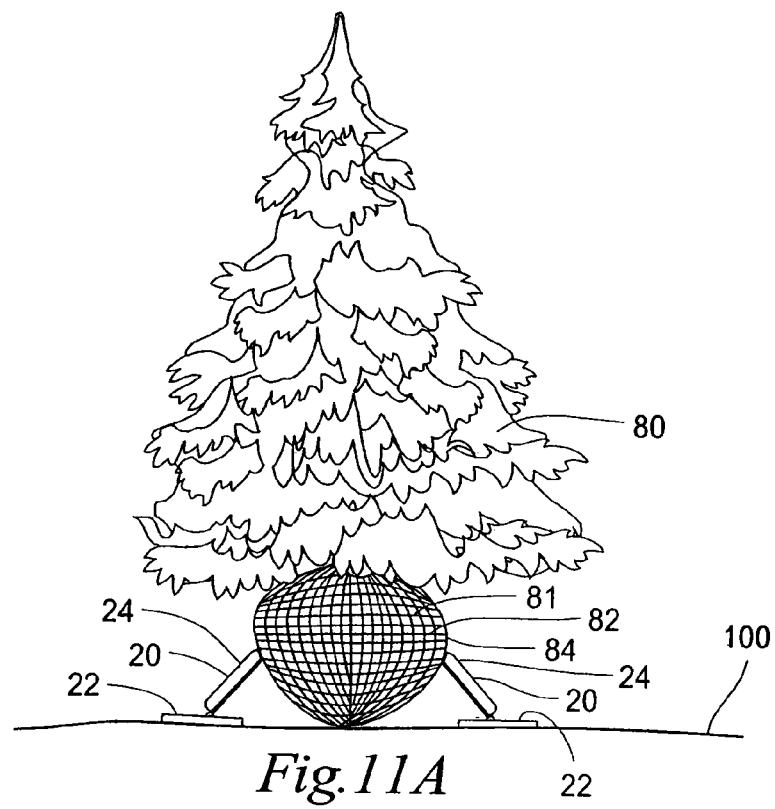
FIG. 11A shows a front elevational view of the leg support apparatus supporting a tree on the ground.

FIG. 11A shows a front elevational view of the leg support apparatus 20 in use supporting a tree 80 on the ground 100. The tree ball 81 is surrounded by burlap 82. The burlap is encased in wire basket 84. When the trees/plants 80 are being lowered by equipment or workers from delivery trucks, the spike 70 of the leg support apparatus 20 is inserted between the wire basket 84 and through the burlap 82. Or, the spike 70 is placed under the lip of the container if the tree/plant is in a container. Then, as the plant is lowered, the base 22 contacts the ground, asphalt, or concrete 100 as the case may be, and the spike 70 sets into the plant or against the container lip. Part of the load of the plant is supported by the leg support apparatus 20 and the other part of the load of the plant is supported by the ground 100.

Leg support apparatuses 20 can be used on the sides of the tree ball 81 to support the tree ball 81. The support provided by the leg support apparatuses 20 will support the tree ball 81 and tree in virtually all weather conditions, even high wind conditions. Additionally, a ground stake 41 (FIG. 1) can be moved through the opening 40 in the base 22 and pounded into the ground 100. The ground stake 41 is used for preventing movement of the leg support apparatus 20. It is noted that in the ground stake 41 is not required in all instances.

The leg support apparatus 20 can also be used as a plant anchor, in addition to an apparatus used for supporting trees and bushes in parking lots and nurseries. In particular, when a bush or tree 80 is being planted, a suitable hole is made in the earth. Then, the spikes 70 of the leg support apparatuses 20 are moved through the wire basket 84 and burlap 82 such that the leg support apparatus 20 is connected to the root ball 81. As the tree 80 is lowered into the hole, the base 22 contacts the earth at the bottom of the hole. Then, the tree 80 is supported by the earth at the bottom of the hole and the leg support apparatuses 20. The tree 80 is leveled by the self leveling nature of the leg support apparatuses 20, and earth is filled in around the root ball 81 of the tree 80. The leg support apparatuses 20 remain buried under ground. Thus, the leg support apparatus 80 can be used for above ground applications and below ground applications. The leg support apparatus 20 can thus be used as an anchor in the planting of trees, shrubs, and bushes.

The leg 24 and base 22 can comprise metals, plastics, wood, epoxy resins, alloys, and combinations thereof, and other suitable materials known to those having ordinary skill in the art. The leg 24 and base 22 can be made by machining processes or molding processes both of which are well known to those having ordinary skill in the art. The pivot pin 26 can comprise high strength steel or other metal or metal alloy. It is noted that these materials and molding/machining processes can be used to make the leg support apparatuses of the other embodiments to be described presently.

Additionally, the ground contacting side 34 of the base 22 can have a surface which is compatible with the area where the leg support apparatus 20 will be used. For example, the ground contact side 34 can comprise a sandpaper like surface if the tree/plants are going to be placed on asphalt or concrete, for example in a sales lot. Or, if the trees are going to be placed on engineered soils, for example those found in some nurseries, the ground contacting side 34 could comprise a ribbed structure or cleats.

Thus, the leg support apparatus 20 eliminates the need for cumbersome and problematic cinder blocks, reduces worker injury, decreases the likelihood of a plant tipping over and being damaged. The leg support apparatus 20 is also compact, easy to use, is relatively inexpensive, can be reused many times, and takes up a minimal amount of storage space.

Figure 11B:
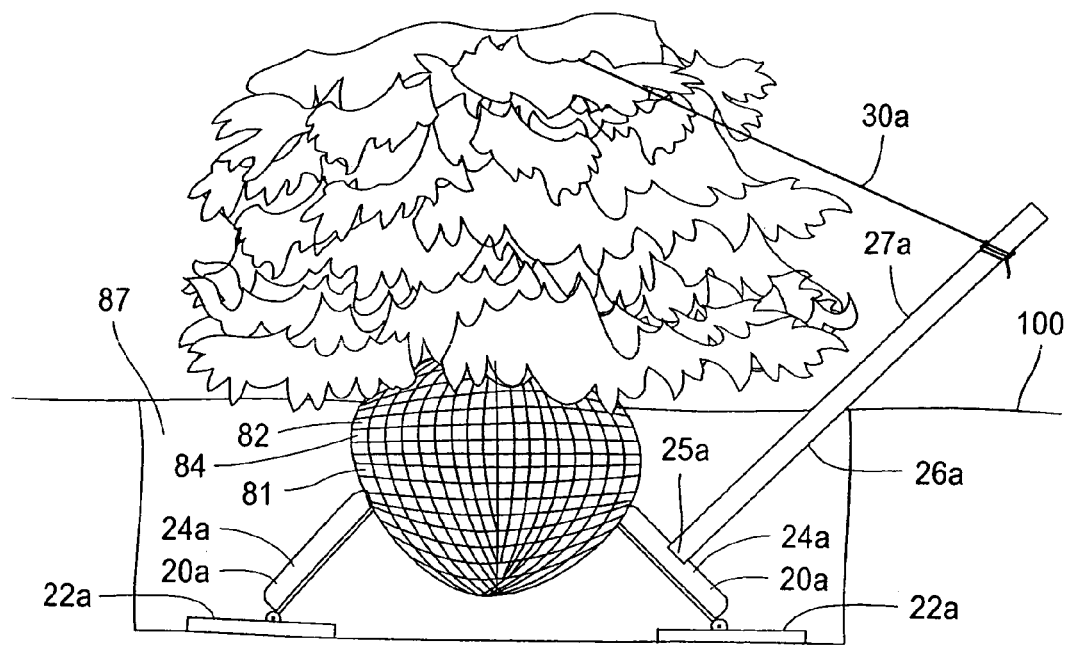
FIG. 11B shows a front elevational below ground view of a second embodiment of the leg support apparatus wherein the tree is planted and staked.

In a second embodiment, shown in FIG. 11B, the leg support apparatus 20a comprises a base 22a and a leg 24a. The tree is shown planted in a hole 87 dug in the earth. Here, the leg 24a is used as a brace. The leg 24a has a recess 25a and the recess 25a is used for receiving a connecting member 26a. The connecting member 26a can be treaded or otherwise connected to the leg 24a. A planting stake 27a can be connected to the connecting member 26a. A guy rope 30a then connects between the tree and the connecting member 26a. As shown in FIG. 11B, this thus provides for a total support system for trees and bushes, allowing them to be anchored and staked if necessary. The connecting member 26a may also be formed integral with the leg 24a.

FIG. 12 shows a perspective view of a third embodiment of the leg support apparatus 220, with a base 222 and leg 224. The leg 224 has a first support 258 and a second support 260 that are perpendicular to one another. A spike 270 extends directly from the first support 258, as shown. A hinged connection 272 connects the base 222 with the leg 224, in the manner described above in connection with the first embodiment. The base 222 has a recess 223. The ground contact side 234 of the base 222 has valleys and ridges or cleats 235. The cleats 235 increase the ability of the base 222 to dig into the surface of soils on which it is used, for example the soils typically encountered in nurseries. FIG. 12A shows a front elevational view, partly in section, of the second embodiment of the leg support apparatus. FIG. 12B shows a sectional view of second embodiment of the leg support apparatus taken along cut line M-M of FIG. 12A.

Figure 13A:
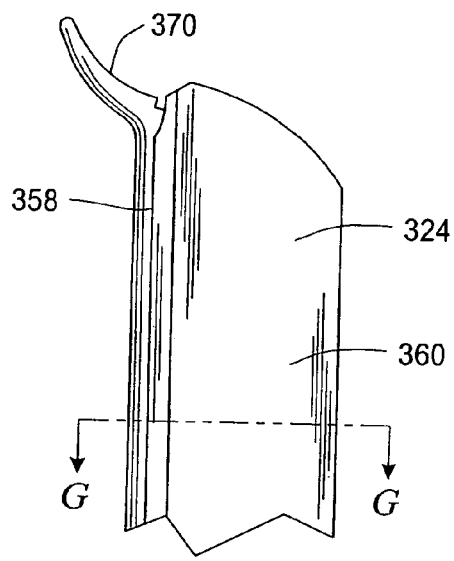
FIG. 13A shows a front elevational view, partly in section, of the fourth embodiment of the leg support apparatus.
Figure 13B:
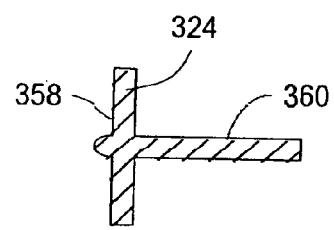
FIG. 13B shows a sectional view of the fourth leg support apparatus taken along cut line G-G.
Figure 13:
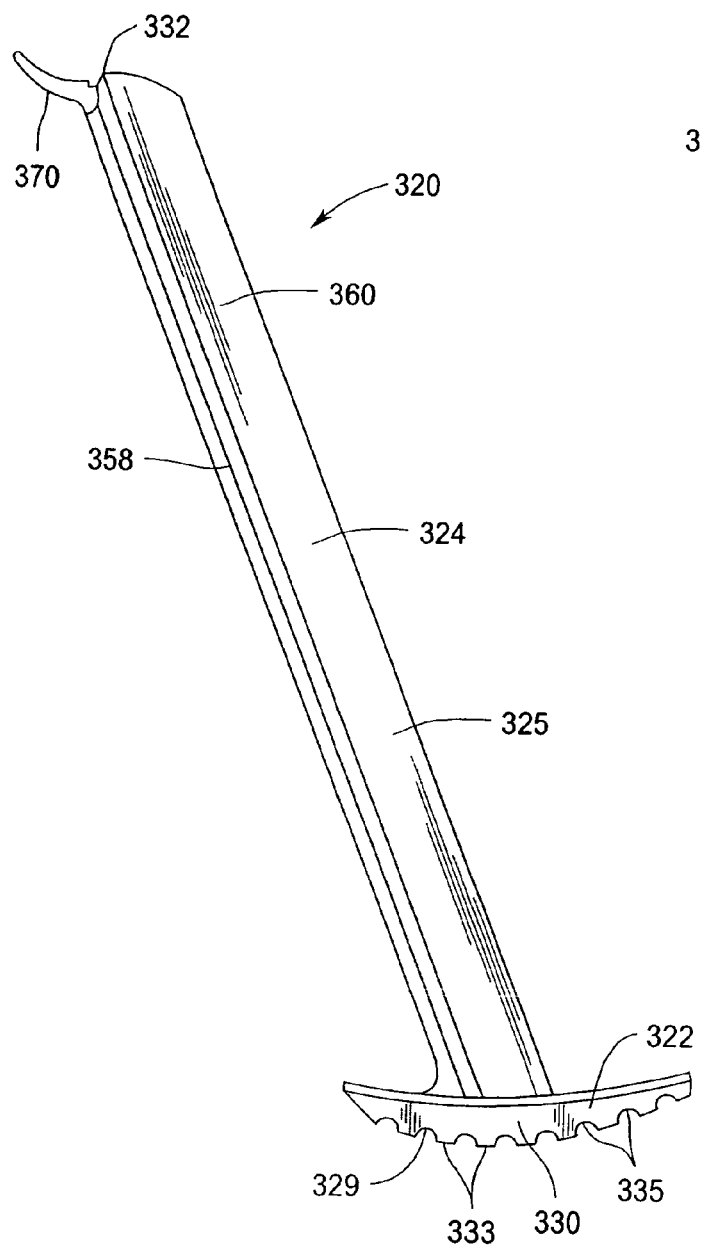
FIG. 13 shows a front elevational view of a fourth embodiment of the leg support apparatus.
Figure 16:
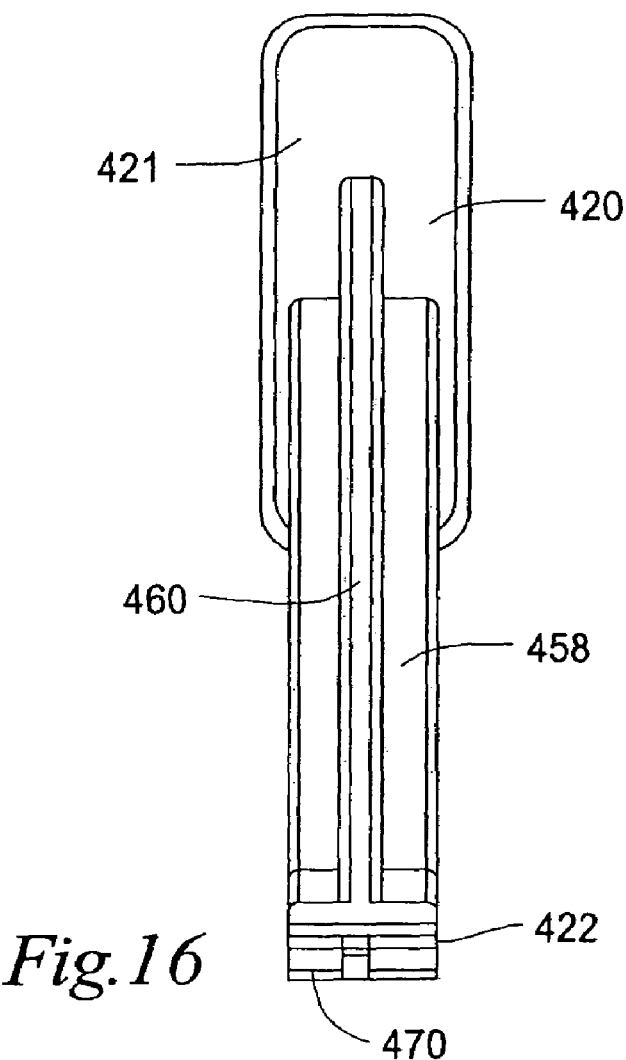
FIG. 16 shows a top plan view of the fifth embodiment of the leg support apparatus.

FIGS. 13-13B show a fourth embodiment of the leg support apparatus 320 wherein the leg support apparatus 320 comprises a body 321 having a rocker bottom base 322 and a leg 324. The rocker bottom base 322 has a curved or rocker bottom shape 333 and a ground contacting side 329 comprising flat portions or grips 333 separated by recesses or valleys 335. The leg 324 extends from the rocker bottom base 322. The need for a pivot pin has thus been eliminated in this embodiment. A spike 370 extends from the spike end 332 of the leg 324, as shown. The first and second supports 358,360, respectively, are perpendicular to one another, as shown in FIG. 13B, which is a view taken along cut line G-G of FIG. 13A. It is noted that the grips 333 formed in the rocker bottom 322 are used for gripping the ground 100.

Figure 17:
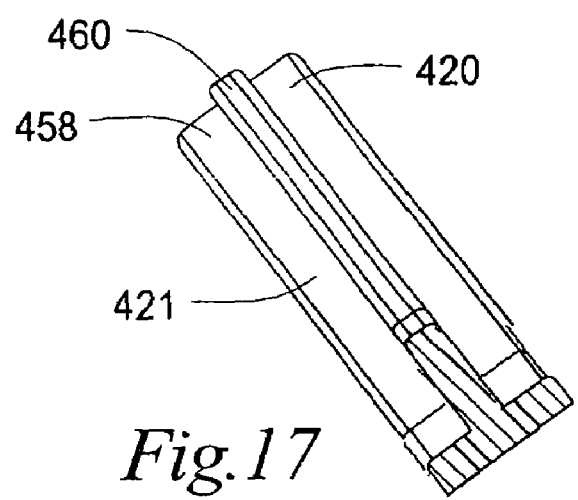
FIG. 17 shows a sectional view of the leg support apparatus of the fifth embodiment taken along cut line D-D.

FIGS. 14-17 show a fifth embodiment of the leg support apparatus 420 wherein the leg support apparatus 420 comprises a body 421 having a rocker bottom base 422 from which extends a leg 424. A plurality of spikes 470 protrude from the leg 424. The leg 424 further comprises a first support 458 and a second support 460 that are perpendicular to one another. The leg 424 has a bend 430 in it. The ground contacting side 425 of the rocker bottom base 422 comprises flat portions or grips 433 separated by recesses 435. FIG. 17 is a view taken along cut line D-D of FIG. 14. As shown in FIG. 17, the first and second supports 458,460, respectively, are perpendicular. The rocker bottom base 422 facilitates positioning of the leg support apparatus 420 under the root ball.

Figure 18:
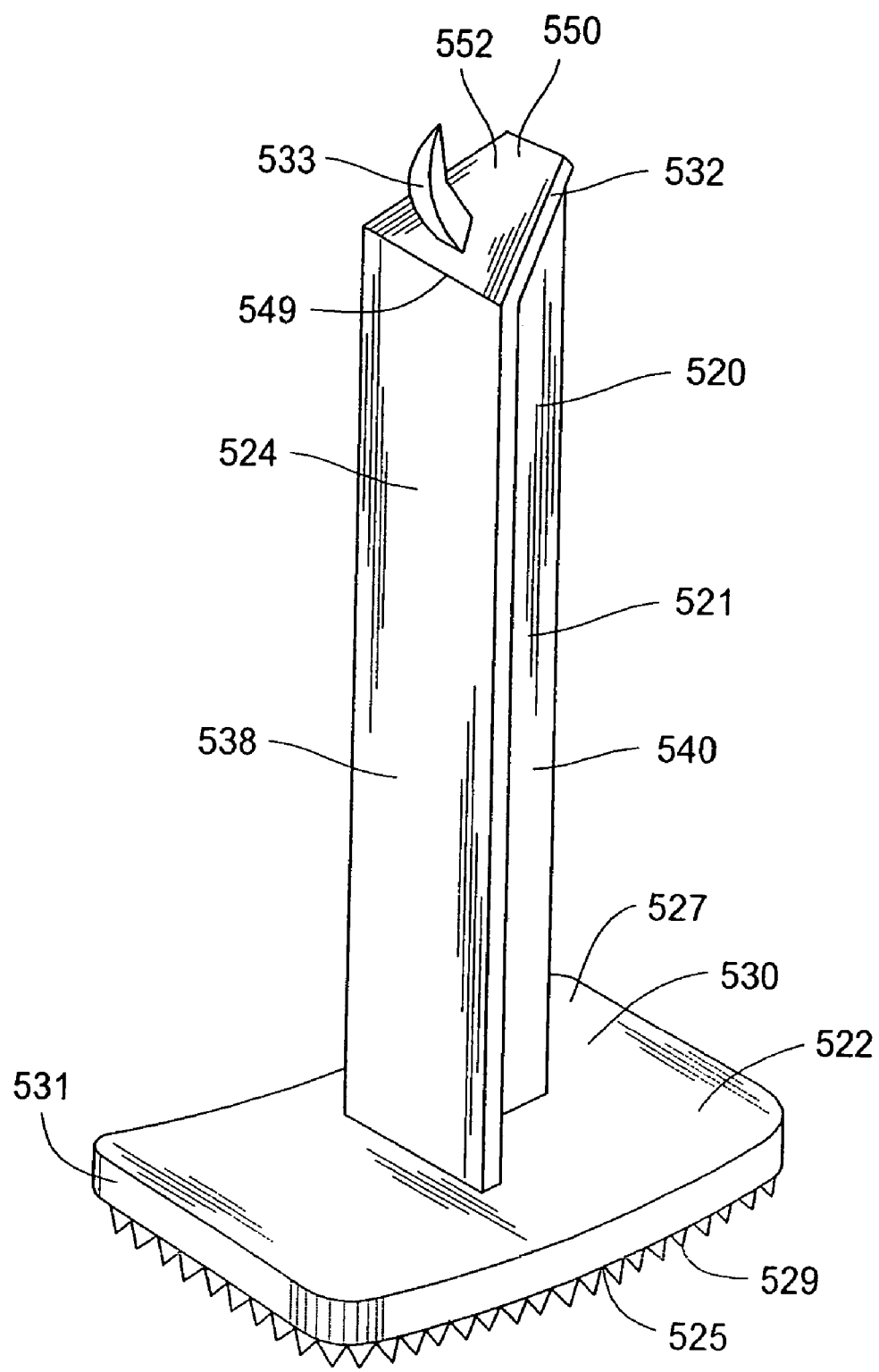
FIG. 18 is a perspective view of a sixth embodiment of the leg support apparatus.
Figure 19:
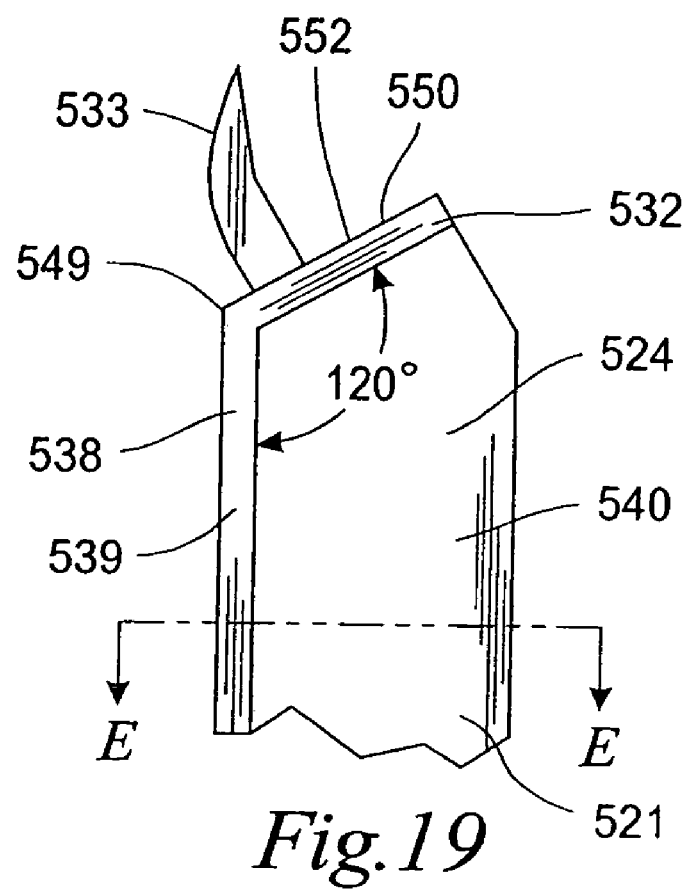
FIG. 19 is a front elevation view, partly in section, of the leg of the sixth embodiment of the leg support apparatus.
Figure 20:
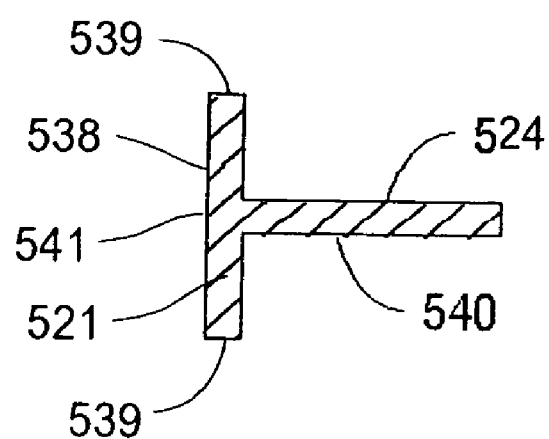
FIG. 20 is a sectional view of the leg of the sixth embodiment taken along cut line E-E.

FIGS. 18-20 show a sixth embodiment of the leg support apparatus 520 wherein the leg support apparatus is a body 521. The body 521 comprises a leg 524 that extends from a rocker bottom base 522. The rocker bottom base 522 has a ground contacting side 525 and a leg side 527, with a surrounding side wall 531 extending between the ground contacting side 525 and leg side 527. The leg 524 extends from the leg side 527 of the rocker bottom base 522. The ground contacting side 525 of the rocker bottom base 522 has a plurality of cleats 529 used for gripping the ground on which the leg support apparatus 520 is placed. The rocker bottom base 522 is curved so that it can be moved relative to the tree or plant to achieve more stable support of the tree or plant.

The leg 524 comprises a first support 538 joined with a second support 540. FIG. 20 is a sectional view of the leg 534 taken along cut line E-E of FIG. 19. FIG. 20 shows that the first and second supports 538, 540, respectively, are perpendicular to one another. It also shows that the first support 538 has side edges 539 and that the second support 540 extends from the first support 538 from about the midpoint 541 of the first support 538, such that the leg 524 has a T-shaped cross section, as shown.

The leg 524 has a rocker end 530 that is joined with the rocker bottom base 522, and the leg 524 has a spike end 532. The spike end 532 has a bend 549. A bent portion 550 meets the first support 538 and second support 540 at the bend 549. The bent portion 550 has a contact surface 552 and a spike 533 extends from the contact surface 552. At the bend 549 the contact surface 552 is at about a 60° angle (sixty degree angle) with respect to the first support 538, as shown in FIG. 19. It is noted that the bent portion 550 could be formed such that the spike 533 extends from the contact surface 552 at various locations on the contact surface 552.

Thus, the leg support apparatus 20 provides for a labor saving way by which trees and bushes can be positioned and maintained in the upright position. Additionally, the plant health is increased because the plants are not falling over which can cause damage to plant limbs and roots. This results in a higher survival rate of the trees and bushes supported by the leg support apparatus. Additionally, the leg support apparatus 20 can be repeatedly used year after year, and the numerous problems associated with the use of cinder blocks and other labor intensive methods is eliminated.

It will be appreciated by those skilled in the art that while a leg support apparatus for trees and bushes has been described above in connection with particular embodiments and examples, the leg support apparatus for trees and bushes is not necessarily so limited and other embodiments, examples, uses, and modifications and departures from the embodiments, examples, and uses may be made without departing from the leg support for trees and bushes. All of these embodiments are intended to be within the scope and spirit of this invention.

What is claimed is:

1. A leg support apparatus comprising:
   a) a leg comprising a first support and a second support and wherein the second support and the first support are joined together, and a the leg having a spike end and an opposed pivot end and a spike extends from the spike end,
   b) a base having a ground contacting side with cleats for digging into soil, and
   c) the base has a lug side with lugs and a pin pivotally connecting the lugs to the pivot end of the leg such that the leg is pivotable relative to the base.

2. The leg support apparatus according to claim 1 wherein the spike is engaged with a lip of a container holding a plant such that the container is maintained in a vertically upright position and is unable to tip over.

3. The leg support apparatus according to claim 1 wherein the base further comprises a recess capable of receiving at least a portion of the leg such that the leg is foldable into contact with the base.

4. The leg support apparatus according to claim 1 wherein the pivot end of the leg has a cylindrical shape and has an opening for receiving the pin.

5. The leg support apparatus according to claim 1 wherein the pivot end of the leg defines a pivot pin opening and the lugs define lug openings, and the pivot pin positioned in the pivot pin opening and lug openings and the pivot pin used for pivotally connecting the leg to the base to form a hinged connection.

6. The leg support apparatus according to claim 1 wherein the spike is engaged with a wire basket surrounding a root ball such that the wire basket is maintained in a vertically upright position and is unable to tip over.

7. The leg support apparatus according to claim 1 wherein the spike extends from the first portion of the leg.

8. The leg support apparatus according to claim 7 wherein the leg and the base each comprise at least one of the following materials including wood, plastic, epoxy, metal, and alloys.

9. The leg support apparatus according to claim 1 wherein the first support and the second support are a one piece body.

10. The leg support apparatus according to claim 1 wherein the first support has side edges and the second support is joined with the first support at about midway between the side edges such that the leg has a T-shaped cross section.

11. A method of making a leg support apparatus comprising the steps of:
   a) providing a leg comprising a first support and a second support and joining the second support and the first support, and providing the leg with a spike end having a spike and an opposed pivot end,
   b) providing a base having a ground contacting and providing the ground contacting side with cleats for digging into soil, and
   c) providing the base with a lug side having lugs and providing a pin and pivotally connecting the lugs to the pivot end of the leg with the pin such that the leg is pivotable relative to the base.

12. The method according to claim 11 further comprising joining the first and second supports such that they are perpendicular to one another.

13. A method of making a leg support apparatus according to claim 11 comprising the further steps of defining in the lug side of the base a recess such that at least a portion of the leg can be received in the recess when the leg is pivoted into contact with the base.

14. The method of making a leg support apparatus according to claim 11 comprising the further steps of forming each of the leg and base from at least one of the following materials including wood, plastic, epoxy, metal, and alloys.

* * * * *